(12) United States Patent
Lopez et al.

(10) Patent No.: US 9,139,378 B2
(45) Date of Patent: Sep. 22, 2015

(54) DEVICE FOR PREPARING SEALING ELEMENTS

(75) Inventors: Remy Lopez, Octeville-sur-Mer (FR);
Zmaj Petrovic, Octeville-sur-Mer (FR);
David Lamoly, Octeville-sur-Mer (FR)

(73) Assignee: GEBO PACKAGING SOLUTIONS FRANCE, Reichstett (FR)

( * ) Notice: Subject to any disclaimer, the term of this patent is extended or adjusted under 35 U.S.C. 154(b) by 315 days.

(21) Appl. No.: 13/807,244

(22) PCT Filed: May 11, 2011

(86) PCT No.: PCT/FR2011/051054
§ 371 (c)(1),
(2), (4) Date: Dec. 27, 2012

(87) PCT Pub. No.: WO2012/001251
PCT Pub. Date: Jan. 5, 2012

(65) Prior Publication Data
US 2013/0098812 A1      Apr. 25, 2013

(30) Foreign Application Priority Data

Jun. 29, 2010    (FR) ...................................... 10 55200

(51) Int. Cl.
| | | |
|---|---|---|
| *B07C 5/12* | (2006.01) | |
| *B65G 47/256* | (2006.01) | |
| *B65G 47/14* | (2006.01) | |
| *B67B 3/064* | (2006.01) | |

(52) U.S. Cl.
CPC .......... *B65G 47/256* (2013.01); *B65G 47/1471* (2013.01); *B67B 3/0645* (2013.01); *B07C 5/124* (2013.01)

(58) Field of Classification Search
CPC .... B07C 5/124; B65G 47/14; B65G 47/1471; B65G 47/256
USPC .................. 209/529, 530, 928; 198/384, 390, 198/397.02; 221/162
See application file for complete search history.

(56) References Cited

U.S. PATENT DOCUMENTS

| | | | | |
|---|---|---|---|---|
| 2,108,257 A | * | 2/1938 | Earling | .......................... 209/654 |
| 2,176,659 A | | 10/1939 | Mundy | |
| 3,086,639 A | * | 4/1963 | Donofrio | ....................... 198/396 |

(Continued)

FOREIGN PATENT DOCUMENTS

| | | |
|---|---|---|
| DE | 10 13 194 B | 8/1957 |
| DE | 89 14 794 U1 | 4/1991 |
| GB | 681 624 A | 10/1952 |

*Primary Examiner* — Joseph C Rodriguez
(74) *Attorney, Agent, or Firm* — Sughrue Mion, PLLC

(57) ABSTRACT

The invention relates to a selecting and screening device (15) for sealing elements or for hollow stoppers intended for a sealing station (4), the device being provided in the form of a chute consisting of two portions: a feed portion (17) and an outlet portion (18), and, between said two portions, a transit channel (20) forming an arc and comprising an ejection window (33), wherein said outlet portion (18) is to be connected to the sealing station (4), said channel (20) partially encloses a wheel (21) provided with notches (22) that match the size of said stoppers (2), and the wheel (21) is associated with pins (30), characterized in that the function of said pins (30) is to support the stoppers (2) in the respective notch (22) thereof as the former pass in front of said ejection window (33), if said stoppers are correctly oriented and not defective, and in that said outlet portion (18) is intended to convey said properly oriented and non-defective stoppers.

22 Claims, 10 Drawing Sheets

(56) References Cited

U.S. PATENT DOCUMENTS

Figure 1:
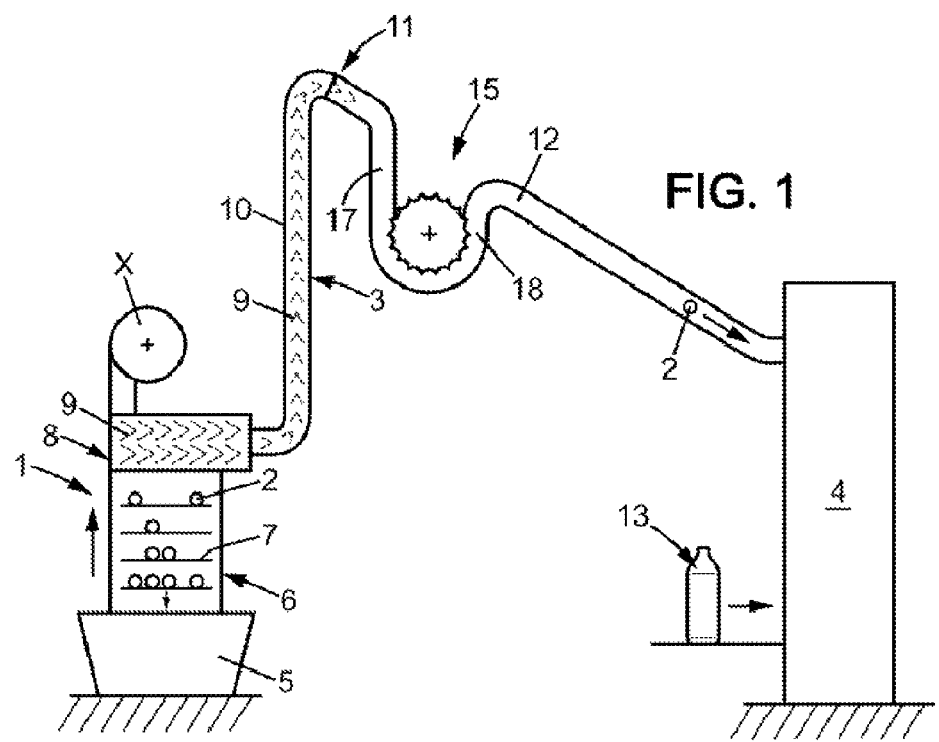

| | | | |
|---|---|---|---|
| 3,095,957 A | 7/1963 | Roberts et al. | |
| 3,432,033 A * | 3/1969 | Everett | 209/560 |
| 3,726,385 A * | 4/1973 | Sterling | 198/392 |
| 3,750,801 A | 8/1973 | Karass et al. | |
| 4,705,156 A * | 11/1987 | Boling | 198/392 |
| 4,879,025 A * | 11/1989 | Shapcott | 209/559 |
| 4,889,243 A * | 12/1989 | Dugan | 209/626 |
| 8,685,337 B2 * | 4/2014 | Beckmann et al. | 422/292 |

\* cited by examiner

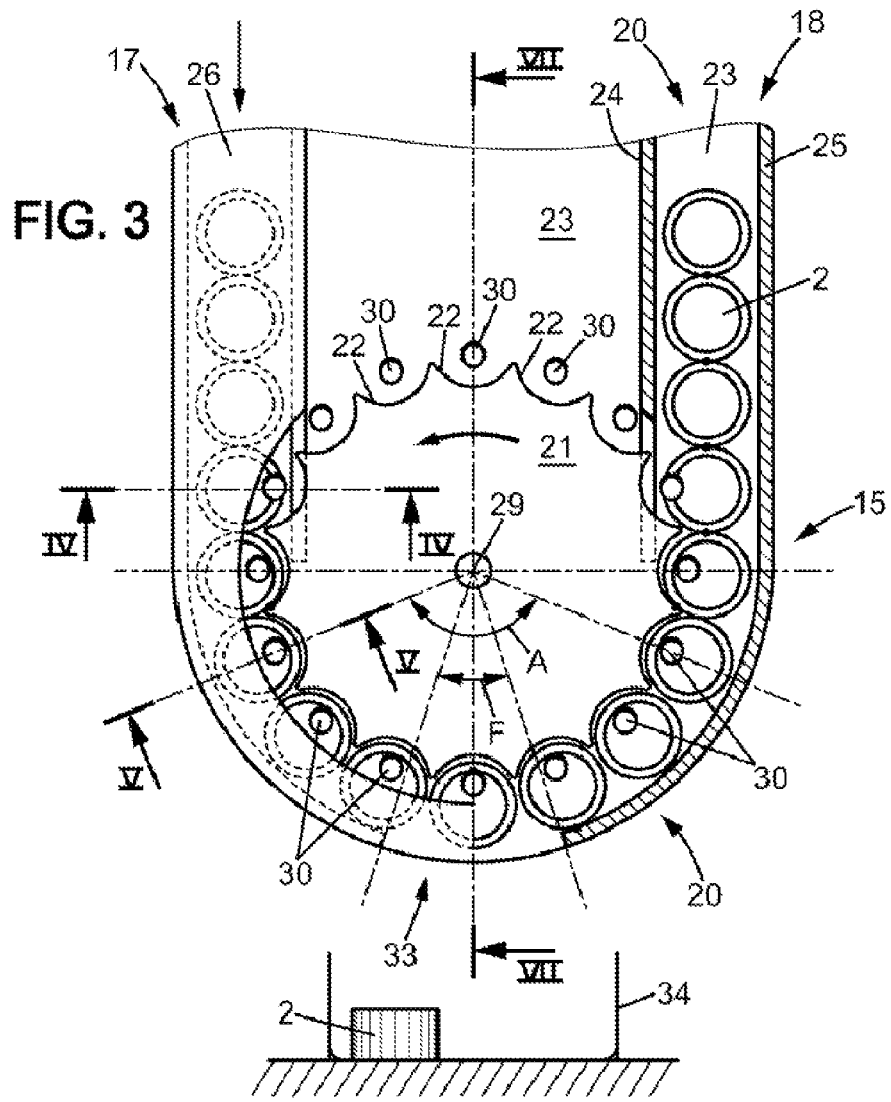
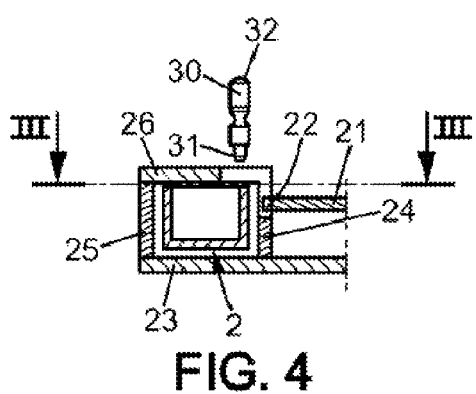
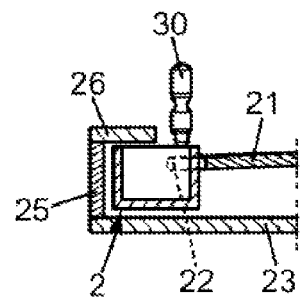

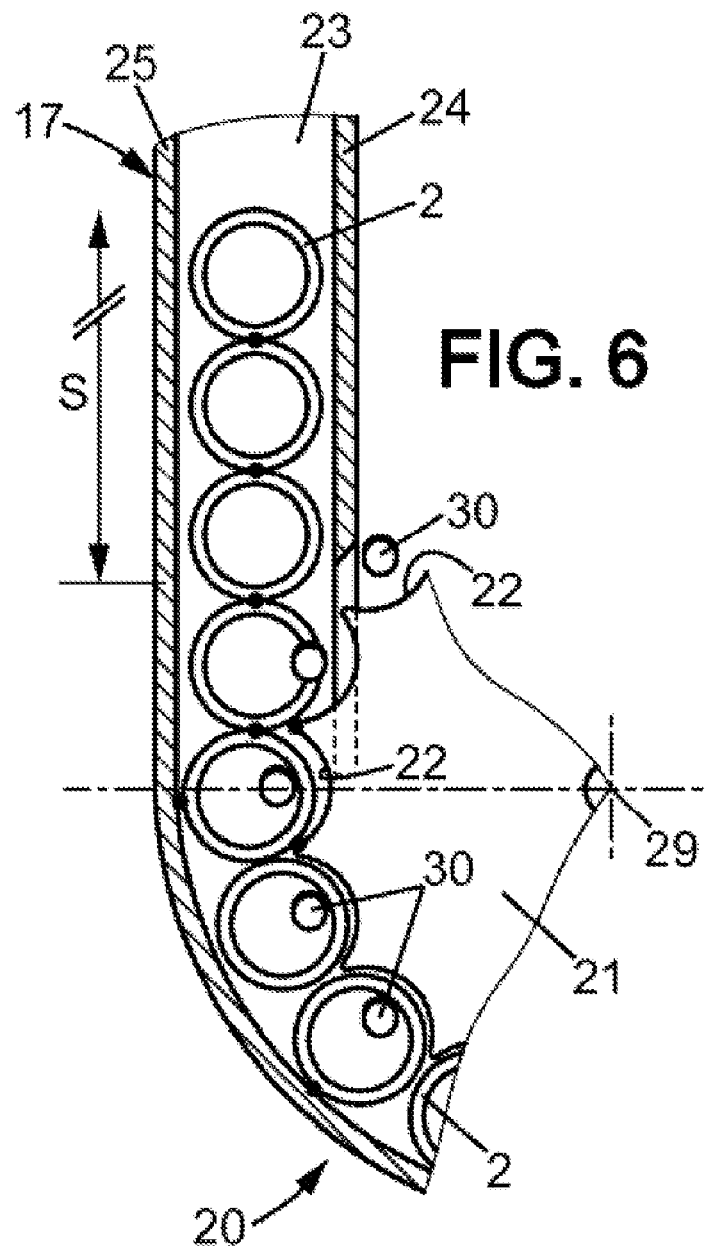

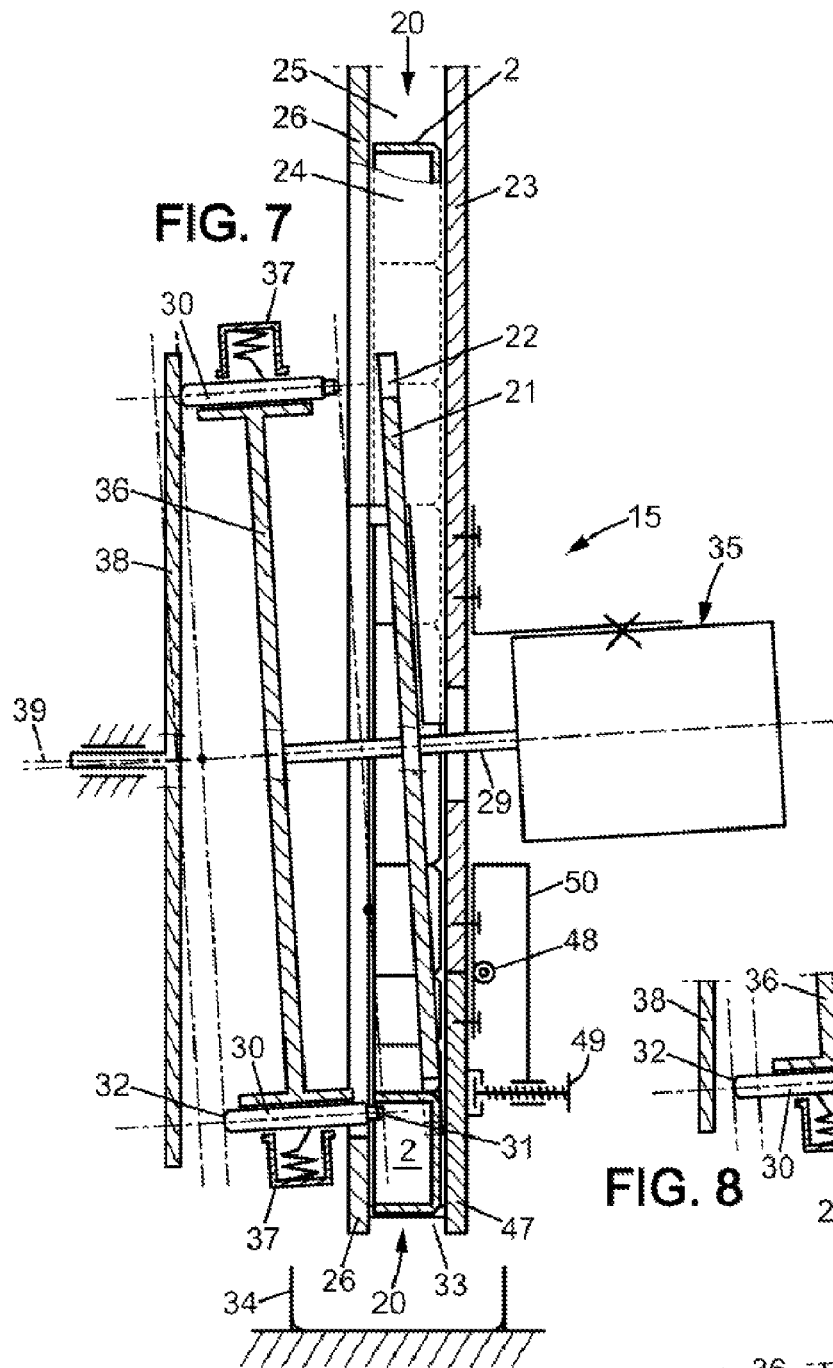
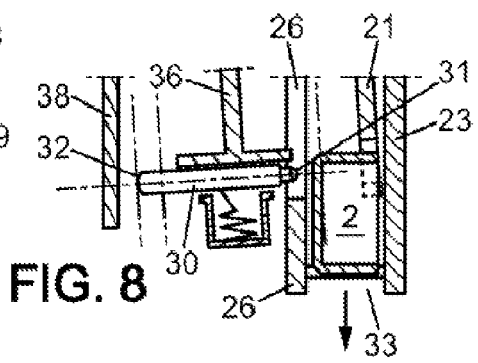
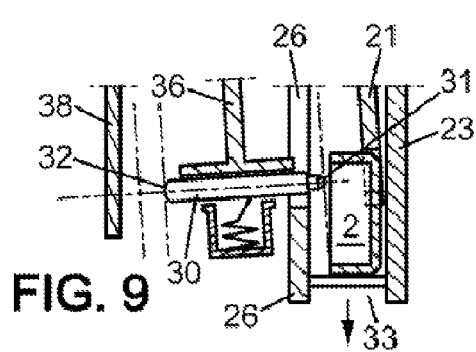

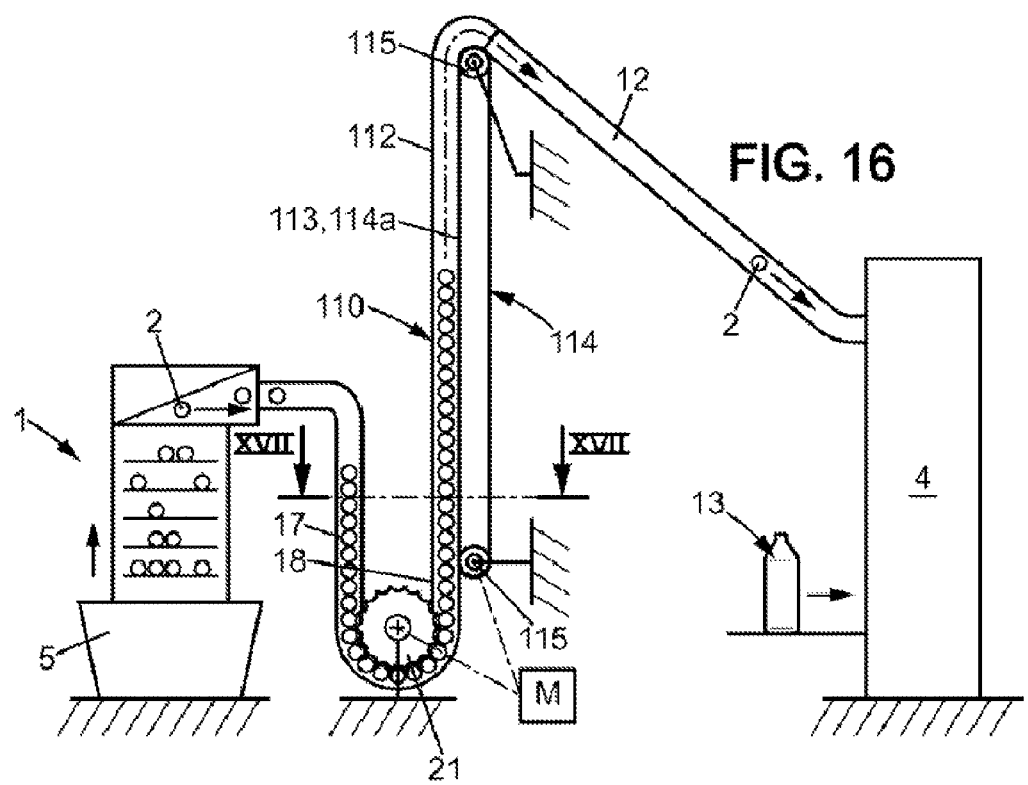
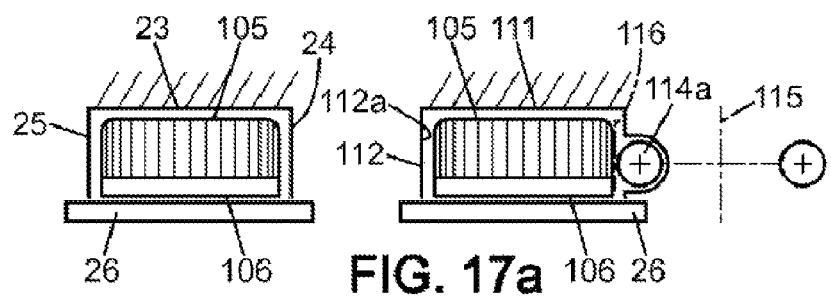
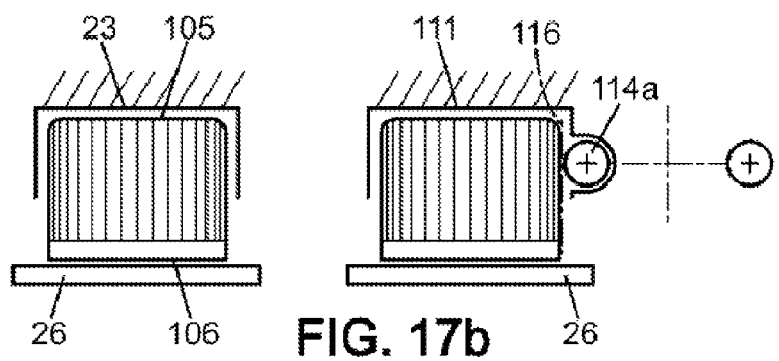

DEVICE FOR PREPARING SEALING ELEMENTS

CROSS REFERENCE TO RELATED APPLICATIONS

This application is a National Stage of International Application No. PCT/FR2011/051054 filed May 11, 2011, claiming priority based on French Patent Application No. 10 55200 filed Jun. 29, 2010, the contents of all of which are incorporated herein by reference in their entirety.

The invention relates to the field of preparing sealing elements such caps, crown, or other elements, in order to feed them to a capping station (also referred to herein as "sealing station") on a filling machine for example.

The invention more particularly relates to a device which allows better preparation of these hollow sealing elements. For simplification, the rest of the description of the invention will essentially concern caps.

The caps are prepared by means of a finishing device commonly called a cap feeder, that is a conveyor belt type of machine as described in document FR 2 876 991, or a vibratory bowl type of machine.

When exiting these machines, the cap is supposed to be properly positioned for delivery to the gravitational chute feeding the capping station. However, this chute still contains a relatively low percentage of incorrectly oriented caps or of non-compliant caps such as caps which have no tamper-evident ring, for example.

In addition, the cap feeder handles the delivery of the properly oriented caps and this generally takes place at a certain height which corresponds to the level of the entrance to the gravitational chute feeding the capping station.

The above document proposes a cap conveyance device which has the advantage of delivering the caps at the required height regardless of the type of cap feeder (conveyor belt or vibratory bowl).

The pneumatic conveying device described in document FR 2 876 991 uses compressed air to propel the caps, which is a relatively costly source of energy that is not always compatible with certain facilities such as sterile facilities where dust is not acceptable.

The present invention proposes a device which supplements these cap feeders in order to guarantee an ideal preparation of the caps before they are delivered to the capping station. The device performs an additional selection and sorting operation in order to eliminate any improperly oriented caps and/or non-compliant caps which are in the line of caps exiting said cap feeder.

Another goal of the invention is to provide, by means of the selection and sorting device of the invention, a complementary function which is similar to the one detailed in said document FR 2 876 991. The selection and sorting device of the invention also acts as a conveyor and offers the possibility of delivering the caps at the required height, meaning at a height which corresponds to that of the entrance to the gravitational chute feeding the capping station, from a cap feeder which makes use of a conveyor belt or even a vibratory bowl.

The invention relates to a selection and sorting device for sealing elements—such as caps—that are hollow and are intended for a capping station. The device is in the form of a chute consisting of two portions: an entrance or feed portion and an exit or outlet portion, and, between these two portions, a transfer channel (also referred to herein as a "transit channel") forming an arc of circle between the two and comprising an ejection window. The exit portion is intended to be connected to the capping station. The channel partially encloses a wheel provided with notches that match the size of said caps. This wheel is associated with means in the form of pins whose function is to retain said caps in their respective notches as the caps pass in front of said ejection window, when they are properly oriented and not defective. The exit portion is intended to convey said non-defective and properly oriented caps.

Advantageously, the ejection window is located in the lower part of the device, such that the caps arriving opposite the ejection window and not retained by a pin fall due to the effect of their own weight. In particular, the ejection window is located in the bottom part of the transfer channel.

The notches of the wheel may be semicircular in shape.

Advantageously, the wheel is able to guide the caps to the exit portion through a part of the transfer channel which extends to each side of the ejection window.

Advantageously, the feed portion is able to guide the caps in a single file and extends above the transfer channel. This allows the feed portion to act as a cap accumulator. This allows the selection and sorting device to be placed in series with another cap aligning device, to perform a possibly additional sort.

Still according to the invention, the pins retaining the caps in their respective notches move between two stable positions: a stable active position which retains said caps in their notches, in which an end of the pin enters the hollow of said cap, and—a stable inactive position in which said caps are not retained.

Advantageously, the pins are able to enter the hollow of a given cap before the cap passes in front of the ejection window.

Advantageously, the inactive position of a pin is at a non-zero distance transverse to the transfer channel such that the corresponding cap is in no way retained by the pin.

Advantageously, the stable inactive position is reached automatically by a reaction when the end of the corresponding pin encounters an inverted cap: said cap prevents said end from entering the hollow of said cap and causes an immediate withdrawing motion of the pin, into the stable inactive position.

In another arrangement of the invention, the selection and sorting device comprises a positive drive mechanism for the wheel with notches, and a pin-supporting flange. Advantageously, the pin-supporting flange is placed and fixed at a distance from said wheel, on its drive shaft.

Advantageously, the pins are brought into said stable active position relative to the wheel, before they are capable of entering the hollow of a cap in the transfer channel.

Still according to the invention, the transfer channel is delimited by slide surfaces comprising, in one hand an inner wall and outer wall which form an arc facing a portion of the peripheral edge of the wheel with notches, said outer wall being discontinuous at the ejection window; and in another hand a back wall and a front wall parallel to said back wall, the front wall being in the form of a slide and being intended to guide the hollow side of the capping elements.

In another arrangement of the invention, the axis common to the wheel with notches and to the pin-supporting flange is inclined relative to the normal of the back wall, in a direction such that the plane of the circle formed by the ends of said pins intersects the slide surface of the front wall along a line which clearly passes above the ends of the ejection window, meaning that the retaining pins gradually enter the hollow of the caps as the caps advance in the transfer channel and they withdraw from the hollow after passing said window.

Still according to the invention, the pin-supporting flange comprises two disks of magnetic material which are parallel to each other and which are equipped with means for guiding the retaining pins, said retaining pins each consisting of a rod of non-magnetic material which is mounted to freely move translationally within at least one of the disks, in an axial direction, and each pin comprising a permanent magnet attached to said rod. Said pin, with its magnet, floats between the two disks.

In another arrangement of the invention, the retaining pin comprises a spacer of non-magnetic material arranged axially between the permanent magnet and each of the two disks, said spacer allowing adjusting the distance of the magnet relative to each disk, said distance being greater between said magnet and the disk on the cap side than between said magnet and the other disk.

Still according to the invention, the selection and sorting device comprises a cam for resetting the retaining pins, this reset cam being able to return the retaining pins, when they are located outside the angular area of the ejection window, from the stable inactive position to the stable active retaining position.

In another arrangement of the invention, the retaining pins each have a reset end which is at the opposite end from the retaining end, said reset ends being located, when the retaining ends are inactive, in a plane which intersects the plane of the reset cam above the level of the ends of the ejection window, causing said pins to return to their position automatically as they rotate with the wheel with notches and come into contact with the reset cam.

Still according to the invention, the reset cam is in the form of a disk which can rotate freely, parallel to the back wall.

With its wheel with notches that individually captures each cap and propels it forward, the selection and sorting device can act as a conveyor, said conveyor comprising an exit chute having a height that can be adjusted by means of sections in order to deliver the caps at an appropriate level. The appropriate level depends on the level of the entrance to the chute feeding the capping station. The selection and sorting device can comprise a feed chute of a height chosen so as to accumulate a certain amount of caps and be able to drive and control the operation of said wheel with notches. This control includes a system which makes use of a sensor to detect the presence of caps. The detection system is located upstream from the wheel with notches, on said feed chute.

Still according to the invention, the lower portion of the back wall comprises a panel which can be removed to allow emptying the channel, and in particular, to allow the removal of caps retained by the pins and possibly caps in the feed chute and/or exit chute. This panel is mounted to move relative to the back wall, by means of a hinge, for example, and is actuated by an actuating means such as a simple screw inserted between the panel and a tab that is integral with said back wall.

In one embodiment, the device comprises an adjustment mechanism designed to move the front wall relative to the back wall in an adjustment direction substantially perpendicular to the back wall, in a manner that varies the height of the transfer channel between a maximum height and a minimum height.

Advantageously, the adjustment mechanism is designed to move the front wall, the pin-supporting flange, and the reset cam by a same adjustment distance.

In another aspect, the invention concerns a device for hollow caps, comprising a chute able to guide the caps in a single file, said device being equipped with a propulsion means for propelling the caps along the chute towards an exit portion of the chute, said exit portion having at least one rising part that rises above the propulsion means, said part being delimited by at least one fixed back wall and two side walls facing one another and each extending along a guide surface, the back wall being intended to receive the cap bottoms and the side walls being intended to guide the edges of said caps; at least one of the side walls is able to move relative to the back wall in a sliding upward motion along the same guide surface.

Advantageously, said rising part extends to a height above the propulsion means that is more than 100 times the lateral guiding width of the chute, for example greater than 2 m, notably between 2.5 and 5 m, and in particular between 2.7 m and 4 m.

Advantageously, the rising part can be straight. The lateral guiding surfaces can be substantially planar.

Advantageously, the rising part can be substantially vertical.

Advantageously, the cap propulsion means can comprise a wheel with notches and a positive drive means for rotating the wheel with notches.

Advantageously, the moving wall consists of a portion of a belt.

Advantageously, the device comprises a positive drive mechanism for said moving side wall, designed so that the speed of said moving side wall is greater than the speed at which the caps are advancing in the exit portion as imposed by the propulsion means.

Advantageously, the speed of said moving side wall is between 1.05 and 1.3 times the speed of said caps in the chute.

Figure 2:
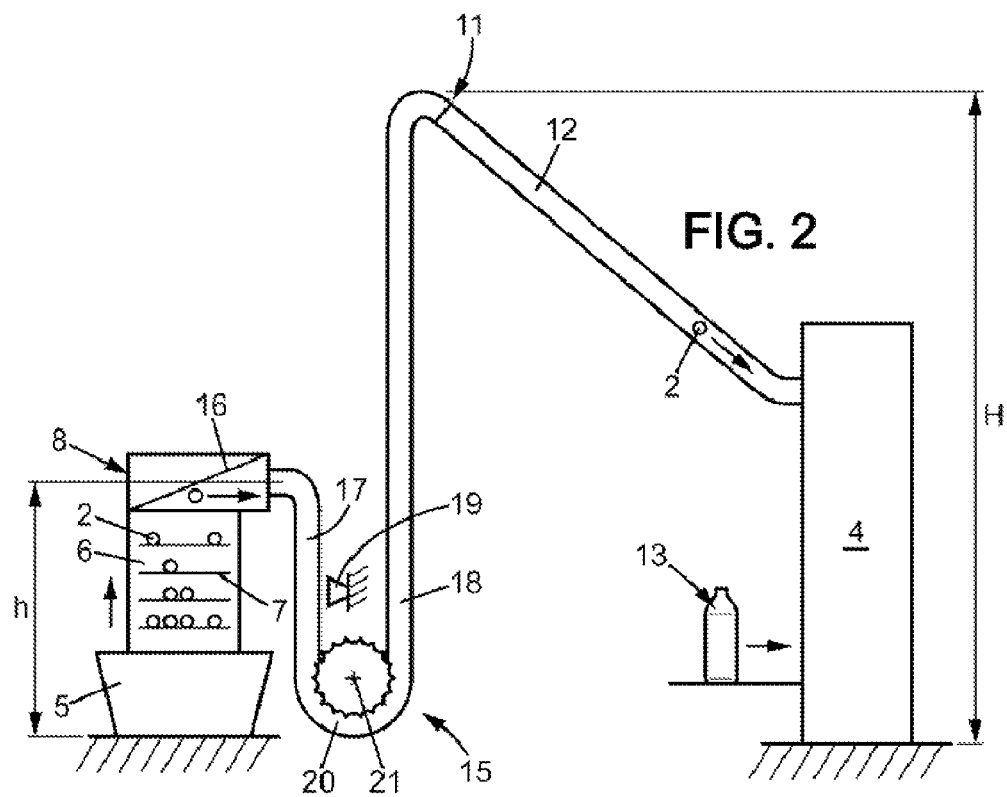
Figure 10:
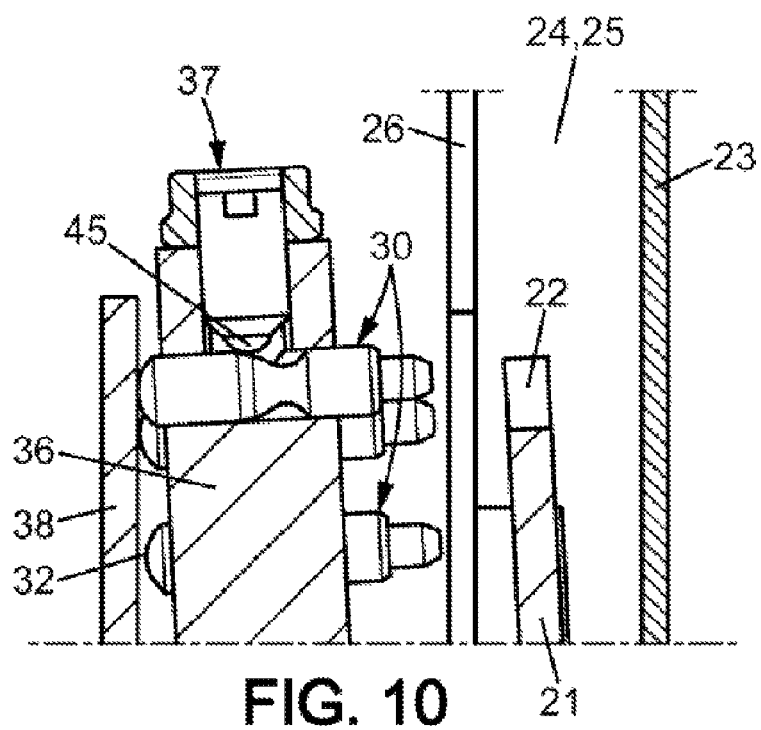
Figure 11:
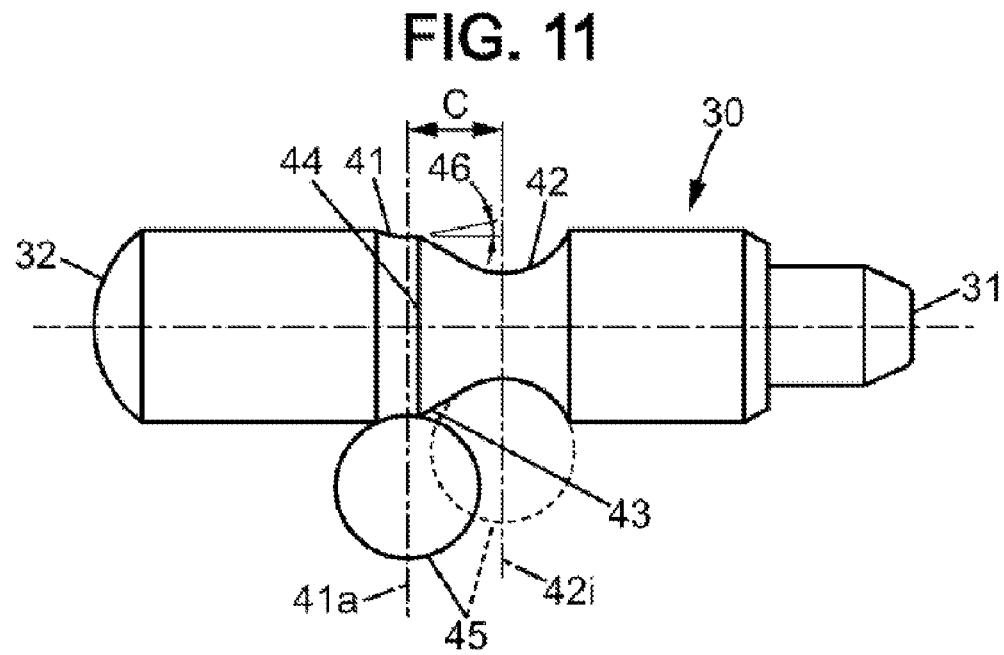
Figure 12:
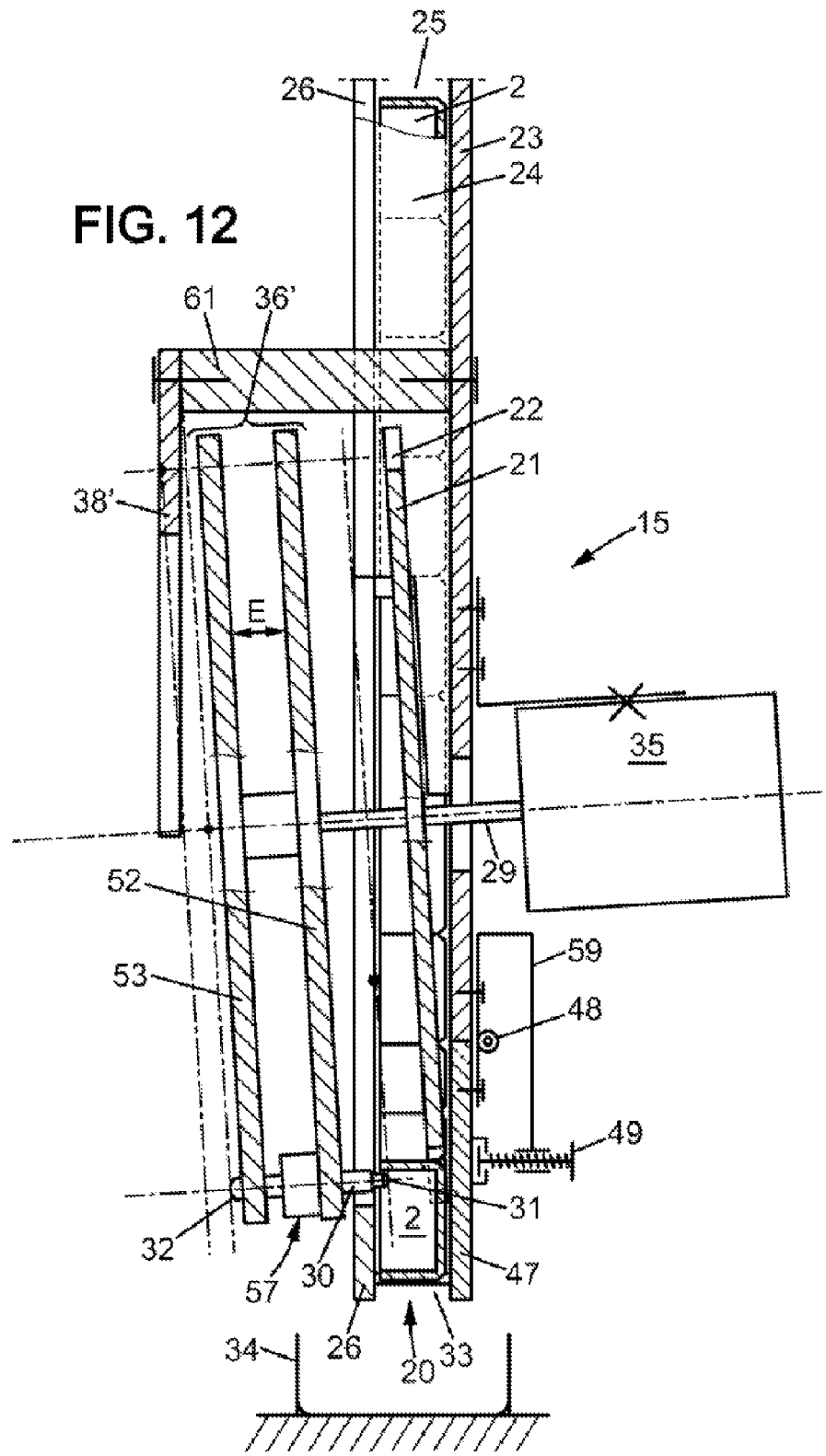
Figure 13:
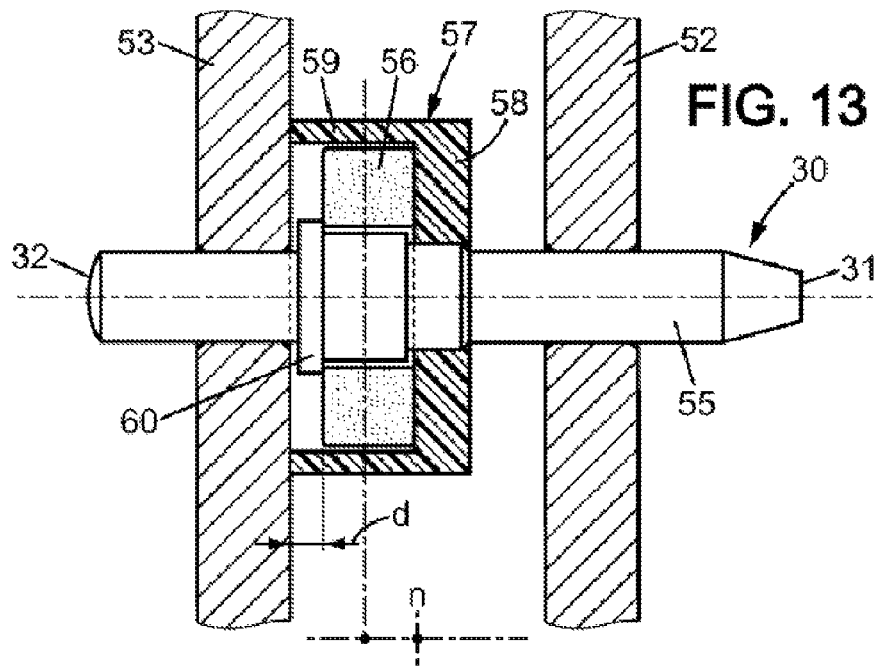
Figure 14:
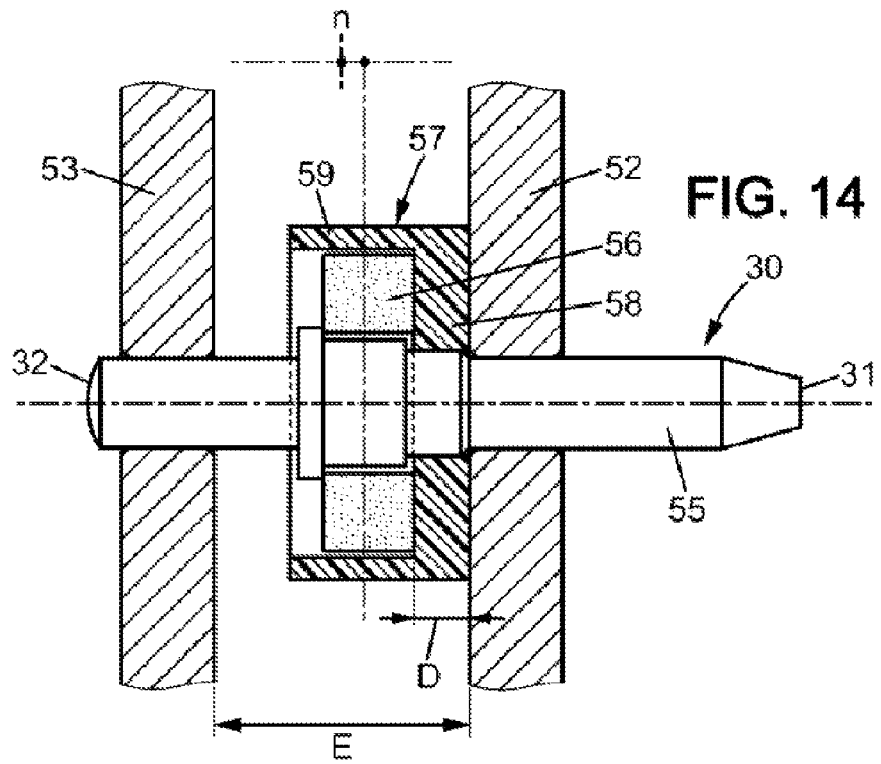
Figure 15:
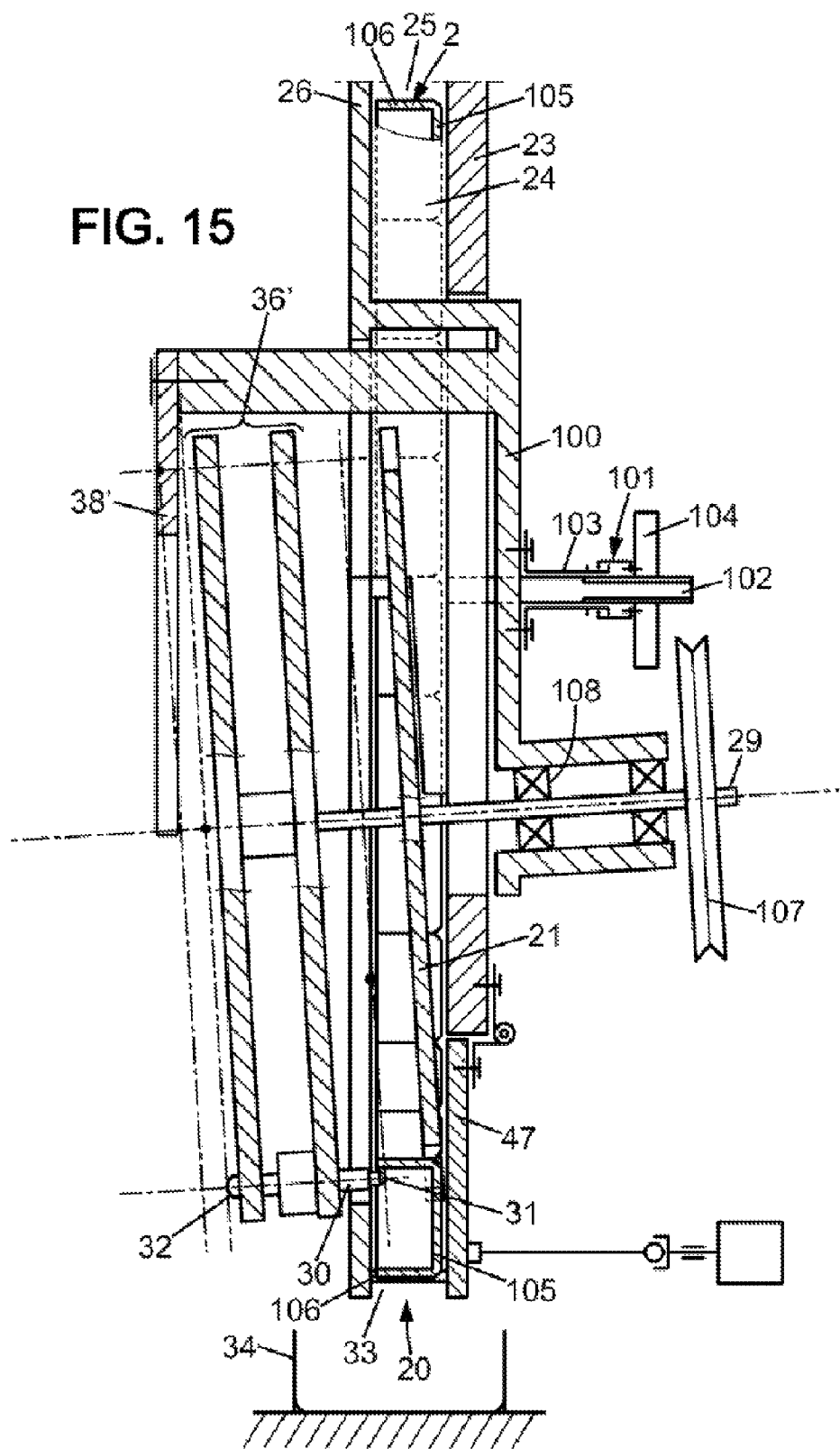
Figure 18A:
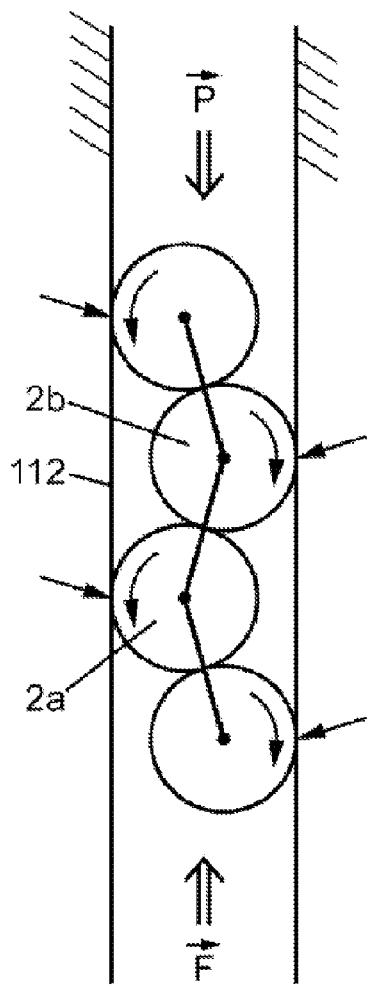
Figure 18B:
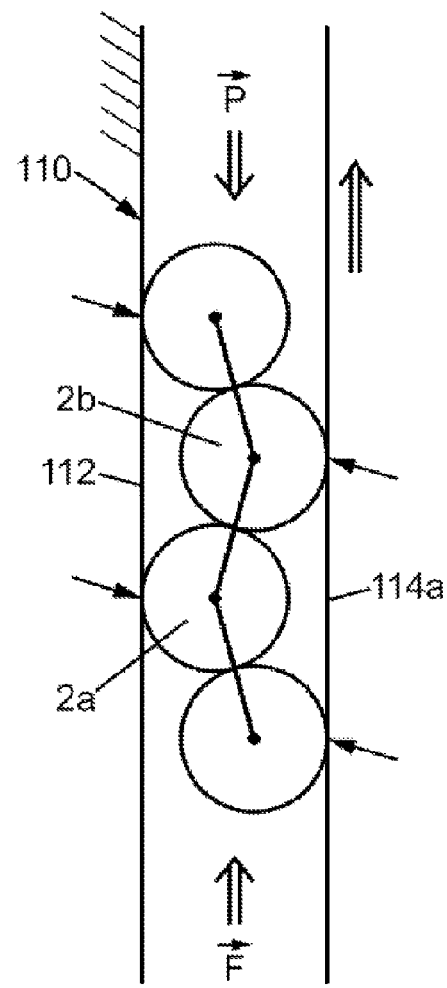

The invention will be better understood by examining the following detailed description of several embodiments provided as examples that are in no way limiting, accompanied by the attached drawings in which:

FIG. 1 shows a facility comprising a sealing element preparation machine (cap feeder) and a capping station with, between the two, an additional device for selection and sorting according to the invention, which is installed on the chute feeding this capping station, FIG. 2 shows another preparation machine which is equipped with the device according to the invention; said device combines the selection operation with an operation of conveying and raising the caps, FIG. 3 is a partial front view of the device equipping the machines represented in FIGS. 1 and 2, with a partial cutaway view in the right side of the figure, along the plane III-III of FIG. 4, FIG. 4 is a partial cross-section along the plane IV-IV of FIG. 3, showing the respective positions of a cap, of a pin, and of the wheel with notches at the moment the cap engages with the wheel with notches, FIG. 5 is a cross-section along the plane V-V of FIG. 3, showing another position of the pin and of the wheel with notches relative to the cap, in the transfer channel, FIG. 6 illustrates the entrance to the transfer channel and the caps that are interacting with the wheel with notches, FIG. 7 is a schematic elevated view of the selection device during normal operation, from a cross-section along 7-7 of FIG. 3, FIG. 8 is a partial representation of the selection device of FIG. 7, when an anomaly is detected, specifically an improperly oriented cap, FIG. 9 is also a partial representation of the selection device of FIG. 7, when a non-compliant cap is detected, meaning a cap that is properly oriented or improperly oriented, but missing its tamper-evident ring for example, FIG. 10 is a partial elevated cross-sectional view showing a retaining pin cooperating with the locking mechanism for the two stable positions of said pin notably, FIG. 11 represents a retaining pin, FIG. 12 is an elevated cross-sectional view of another embodiment of the system for displacing the retaining pins to move them from their active position of retaining caps into an inactive position, FIG. 13 is a longitudinal cross-section of a retaining pin, illustrating a stable inactive position, FIG. 14 is also a longitudinal cross-section of a retaining pin, illustrating a stable active position in which a cap is retained, FIG. 15 is an elevated cross-sectional view of another embodiment of the device, able to adjust to different cap sizes, FIG. 16 shows a preparation machine equipped with an embodiment of the device adapted for upwardly propelling caps that have ribbed edges, FIGS. 17a and 17b are horizontal cross-sections along plane XVII-XVII of FIG. 16, showing the feed and exit portions for two cap sizes, FIGS. 18a and 18b illustrate the lifting of the caps in a rising portion of the device.

FIG. 1 illustrates a facility comprising a sealing element preparation and sorting machine 1, of the type described in said document FR 2 876 991. The caps 2 are brought by the vertical chute of the pneumatic conveyor 3 to a capping station 4 which is generally located directly at a bottling machine.

The caps 2 are placed in bulk in a hopper 5 of the preparation machine 1. An endless belt 6 that is slightly inclined towards the back is equipped with a series of horizontal battens 7. These battens 7 form or contain slots for capturing and carrying the caps 2 and, after passing over a bump which serves as a sorting station, only the properly oriented caps 2 remain in their slot on the batten 7. The improperly oriented caps 2 automatically fall into the hopper 5 due to their center of gravity no longer lying within the supporting area of the batten 7. In this manner only the correctly oriented caps 2 are carried upwards to an unloading area 8 by the sorting belt 6.

The unloading area 8 is equipped with pneumatic vents 9 which push the caps 2 towards the right of the figure until they enter a single-file chute 10 also equipped with pneumatic vents 9. The single-file chute 10 equipped with its pneumatic vents 9 lifts the caps 2 to a level which corresponds to the entrance 11 to a chute 12 that forms an inclined ramp along which the caps travel due to gravity, leading to the capping station 4. This chute 12 also acts as an accumulator and its length may therefore be relatively significant.

There is also a conveyor of filled containers 13 leading to the capping station 4. The capping station 4 assembles a cap 2 onto each of the filled containers 13. Generally, the sealing element preparation and sorting machines as well as the bottling machines are placed at ground level in the facility.

In its upstream portion, the chute 12 comprises a selection and sorting device 15 which has the function of supplementing the sorting operation conventionally performed by the preparation machine 1.

This selection device 15 is installed at the entrance 11 of the chute 12 feeding the capping station 4. However, in certain cases and depending on the type of preparation machine, this selection device 15 may, as represented in FIG. 2, provide a supplemental conveyance function and elevate the caps in order to deliver them to the required level which corresponds to the entrance to the chute 12 feeding the capping station 4.

In the various figures, the same references designate the same or similar items.

As illustrated in FIG. 2, the device 15, which combines the selection and conveyance functions, connects the unloading area 8 of the preparation machine 1 to the capping station 4. The unloading area 8 can operate differently from the description for FIG. 1. As illustrated here, the caps 2 carried by the battens 7 are ejected from these battens by means of a wiper bar 16 and are directed towards a first chute which acts as a feed chute 17 for the device 15, for example.

The selection and conveyance device 15 is placed between this feed chute 17, which also acts as an accumulator, and an exit chute 18 which climbs vertically to the entrance 11 of the chute 12 feeding the capping station 4. This exit chute 18 fulfills the same role as the chute 10 of the cap feeder of FIG. 1 but with different means for propelling the caps 2; these means are adapted for this type of preparation machine.

For the proper operation of the device 15, the feed chute 17 comprises, as detailed below, a system for verifying the presence of caps 2 that is in the form of a sensor 19.

The selection and advancement device 15 is housed in a transfer channel 20 that forms an arc of circle between the feed chute 17 and the exit chute 18. A wheel 21 equipped with notches 22 along its edge lies partially within this transfer channel 20.

The feed chute 17 is a chute that delivers caps 2 to the transfer channel 20. The notches 22 of the wheel 21 are able to individually capture each of the caps 2 supplied by the feed chute 17. The movement of the caps 2 in the transfer channel 20 is associated with the rotation of the wheel 21 and with the presence of the notches 22 which capture each cap 2. Thus each cap 2 grasped by a notch 22 is propelled along the transfer channel 20 and up to the upper end of the exit chute 18.

When a cap 2 is advanced by the wheel with notches 21, it pushes the whole set of the caps contained in the exit chute 18. The positive driving of the caps by the wheel 21 with notches and the mechanical resistance of each of the substantially rigid caps 2 causes the caps 2 to rise in the exit chute 18 to at least the entrance 11 to the chute 12 feeding the capping station 4. The conveyance device 15 quietly and reliably raises the caps 2 for a height H to the chute 12. This wheel 21 with notches behaves like a pump providing a flow of substantially rigid objects.

The exit chute 18 preferably consists of segments, not represented, which allow adjusting this height H as needed in order to deliver the caps 2 to the capping station 4.

The feed chute 17 which guides the caps 2 may have a vertical portion extending above the channel 20. The vertical portion of the feed chute 17 is able to guide the caps 2 in a single file. Thus the caps 2 delivered by the preparation machine at a height h, are piled on top of each other to form a buffer stockpile upstream from the wheel 21 with notches, at a height which is on the order of about 1 m and which is controlled by the sensor 19. The buffer stockpile consists of caps 2 pressing against each other due to the effect of their own weight.

In the case of the preparation machine of FIG. 1, the device 15 has a simple function of selecting and sorting the caps 2; however, the feed chute 17 supplying caps 2 to the wheel 21 with notches and the exit chute 18 are found again here. These chutes 17 and 18 only provide simple delivery and exit functions unrelated to the functions they perform in the case of FIG. 2 where the device additionally provides the cap lifting function.

FIGS. 3 to 5 show the part of the device 15 which is common to both types of preparation machines. This is the part which causes the caps 2 to travel in the channel 20 and which performs the selection and sorting function.

The feed chute 17, the exit chute 18, the transfer channel 20, and the wheel 21 are symmetrical relative to the vertical plane VII-VII of FIG. 3. The left part of FIG. 3 is a partial front view; the right part is a cutaway view along the plane III-III of FIG. 4.

A back wall 23 extends for the entire width of the device 15, from the feed chute 17 to the exit chute 18, acting as a frame for the entire device 15.

The feed chute 17 and the exit chute 18 each have guide surfaces: an inner side wall 24 and an outer side wall 25, as well as a front wall 26 that runs in front of the feed chute 17 and exit chute 18, parallel to the back wall 23. The feed chute 17 and the exit chute 18 have a rectangular cross-section composed of the above various walls: the back wall 23 and the front wall 26 which are parallel to each other, as well as the side walls 24 and 25 which are also parallel to each other. The cross-section of chutes 17 and 18 corresponds to the footprint of a normally shaped cap 2.

The wheel 21 with notches is made to rotate on a drive shaft. A plurality of retaining pins 30 are also rotated along with the wheel 21 with notches. Each notch 22 of the wheel has a corresponding retaining pin 30 positioned in front of and facing said notch 22. During its rotation, the retaining pin 30 corresponding to a notch 22 approaches or draws away from the back wall 23 of the conveyance device 15.

The transfer channel 20 is delimited by the back wall and by the front wall 26 which acts as a slide for the caps 2. This slide only covers the outer peripheral portion of said channel 20 in order to allow the passage of the pins 30. This front wall 26 closes off the channel 20 at the chutes 17 and 18 without covering the entirety of the guide channel 20. This allows each pin 30 to cooperate with a cap 2 positioned in the notch 22 corresponding to said pin 30.

The mechanism allowing the advancement of the caps 2 and the axial displacement of the retaining pins 30 will be detailed in relation to FIGS. 7 to 11.

As illustrated in FIGS. 4 and 5, the position of the retaining pin 30 varies relative to the caps 2 so as to place each of its ends 31 and 32 in positions which allow it to be active or inactive depending on the case, as detailed below. In fact, the end 31 has a direct relationship with the caps, while the opposite end 32 causes said pin 30 to move and specifically to return to its active retaining position after the passage of an improperly oriented cap 2.

In FIG. 4, the pin 30 is represented in a withdrawn position relative to the upper lip of the cap 2 when said cap is not yet captured by the corresponding notch 22. Conversely, when the notch 22 is grasping the corresponding cap 2, FIG. 5, the cap is advanced translationally along the transfer channel 20. The corresponding retaining pin is in contact with the edge of the cap 2.

The conveyance device 15 is arranged to provide an arc section A in which the end 31 of the retaining pin 30 enters the hollow of the correctly oriented corresponding cap 2. Due to this, within this arc section A the pin 30 verifies with its end 31 the proper orientation and/or the compliance of said corresponding cap 2.

The outer side wall 25 of the channel 20 is discontinuous for an arc section F which is smaller than the arc section A. In other words, the transfer channel 20 has an ejection window 33, located in the lower portion of the conveyance device 15. Preferably, the angle of the ejection arc section F is between 40° and 80°. The angle of the guidance and verification arc section A is larger than that of the ejection arc section F; it extends to each side of the ejection arc section F for an additional angle sufficient to give the pins 30 the time to enter into the hollow of the corresponding cap 2; this arc section A defines, for example, an angle of between 90° and 180°.

In other words, when a cap 2 traveling along the channel 20 is opposite the ejection window 33, it is no longer retained by the outer side wall 25 but only by the end of the corresponding retaining pin 30. If the cap 2 is incorrectly oriented, it is then possible to retract the retaining pin 30 so that the defective cap 2 falls through the ejection window 33 due to the effect of its own weight, into a collection bin 34 placed on the ground for example.

The pin 30 serves to detect defects and also serves as a remedy when a defect is detected. It is both a defect detection sensor and retractable retaining means.

Using FIG. 6, the entrance to the channel 20 and the synchronization between the rotation of the notched 22 wheel 21 and the arrival of the caps 2 will now be described. To prevent a cap 2 from becoming stuck at the entrance, the invention proposes a simple synchronization means consisting of guaranteeing that the caps 2 located in the entrance area of the channel 20 are systematically incorporated into a line of caps 2 in successive contact with one another. The continuous line of caps, extending from a cap 2 already captured by a notch 22 to one or more caps 2 located in an end portion of the feed chute 17, forms a buffer stockpile S.

The position of the cap 2 as it follows the transfer channel 20 is completely determined by the notch 22 which holds it. In other words, at the moment of its arrival in the channel 20, each cap 2 is held, with no risk of becoming stuck, between its contact with the tooth of the notch 22, its contact with the outer side wall 25, and its contact with the next cap 2.

In the example illustrated in FIG. 6, the end portion of the feed chute 17 extends vertically above the cap already captured by the notch 22, such that the entire weight of the caps 2 in the buffer stockpile is also supported by said notch 22. The caps 2 in the feed chute 17 to the channel 20 thus have their position synchronized with the rotation of the wheel 21 with notches.

A buffer stockpile S is maintained in the feed chute 17, under the control of the sensor 19, to a height of about 1 m.

Alternatively, the end portion of the feed chute 17 as well as the entrance area of the channel 20 could simply be inclined relative to the horizontal.

To better control the position of the caps 2 in the entrance area of the channel 20, the inner side wall 24 extends behind the wheel 21 with notches sufficiently to ensure that the cap 2 it is guiding is completely retained by a notch 22.

FIGS. 7 to 11 show more details of the cap 2 selection and sorting system.

The drive shaft 29 of the star wheel 21 is located in the plane of symmetry of the device 15 and it is angled relative to the normal of the back wall 23 by an angle of between 1° and 10° and preferably between 2° and 5°. The tilt angle of the drive shaft 29 is oriented towards both the front and the bottom of the device 15.

The selection and conveyance device 15 comprises a mechanism for driving the retaining pins 30. This driving mechanism consists of:
  a driving motor 35 which is integrally attached to the back wall 23, and,
  a flange 36 which is attached at a distance from said wheel 21 with notches, to the drive shaft 29.

The motor 35 is controlled by means of a programmable logic controller or some other means, taking into account the information provided by the control system and in particular by the sensor 19 which monitors the level of caps 2 in the feed chute 17.

The various retaining pins 30 are supported by the flange 36 and are guided translationally in a direction parallel to the drive shaft 29. These pins 30 are distributed all around the wheel 21 with notches so that they are opposite each of said notches 22.

For each retaining pin 30, the flange 36 is equipped with a spring mechanism 37 which pushes the retaining pin 30 either into a stable active retaining position in which the end 31 of said pin 30 is positioned towards the back of the device 15, as illustrated in FIG. 7, or into a stable inactive position, illustrated in FIG. 8, where the end 32 of said pin 30 is positioned towards the front part of the device 15.

Each of the pins 30 comprises an active retaining end 31, located towards the back wall 23, able to enter the hollow of a correctly oriented cap 2 while said retaining pin is within the retaining arc section A, illustrated in FIG. 3. The set of active ends 31 of each of the retaining pins 30 defines a circle of reference which is coaxial to the drive shaft 29. This circle of reference intersects the slide surface of the front wall 26 of the channel 20 at a line which is located above the level of the ejection window 33, and this line defines the arc section A in which the caps 2 are retained due to the action of the pins 30.

As illustrated in FIG. 8, an improperly oriented cap 2 pushes the pin 30 towards the front of the device 15 (which is towards the left in FIG. 8). A bistable spring 37 mechanism, which comes between the flange 36 and the pin 30, automatically drives said corresponding retaining pin 30 towards a second stable, but inactive, position. In the stable inactive position, the active end 31 of the retaining pin 30 is no longer pressing against the bottom of the defective cap 2 and this defective cap 2 falls through the ejection window 33 due to the effect of its own weight.

An inability to access the hollow area of the cap 2 may also result from another type of defect, such as a plastic film partially or completely covering said hollow area of the cap 2. The defective cap 2 may also, as represented in FIG. 9, be a cap without its tamper-evident ring or be a solid cap resulting from molding without the mandrel. In other words, the sorting means allows testing for the existence of a correctly oriented hollow zone for each cap 2.

In fact, this sorting means offers total security concerning the feed to the capping station of a bottling machine.

The retaining pins 30 each have a second end 32 opposite the end 31. This second end 32 is facing the forward, or front, side of the conveyance device 15. When the retaining pin 30 is in the stable active position, as illustrated in FIG. 7, the end 32 moves along a second circle of reference. When the pin 30 is in the stable inactive position, illustrated in FIG. 8, meaning when it is advanced towards the front of the device 15, the circle of these ends 32 is displaced towards the front of the device 15 and further away from the flange 36.

The sorting means also comprise a reset cam 38 able to return the retaining pins 30 located outside the angular area containing the ejection window 33, from the second stable inactive position illustrated in FIG. 8 to the stable active position illustrated in FIG. 7.

The reset cam 38 is in the form of a disk which is parallel to the plane of the back wall 23 of the transfer channel 20. The reset cam 38 rotates on a shaft 39 that is integrally attached to the back wall 23, perpendicular to this wall 23, and this shaft 39 passes through the center of the circle of reference of the ends 32 of the pins 30. This circle of reference of the ends 32, when the pins 30 are in the active position of retaining the caps 2, is substantially distanced from, and possibly even tangential to, the reset cam 38. But when a retaining pin 30 has swung into the second stable, inactive, position due to a defective cap 2, the circle of reference of the end 32 of this retracted pin 30 intersects the plane of the cam 38 at a level which is located above the ends of the ejection window 33, and therefore said retracted pin is progressively returned to its active position. The pressure from a retracted pin 30 is sufficient to rotate the reset cam 38. Such a reset cam 38 has the advantage of not generating any friction as it returns the retaining pin 30 to its first stable active position.

As illustrated in FIG. 11, each of the retaining pins 30 forms a symmetrical cylinder around its axis. The pin 30 has a first ball bearing face 41 and a second ball bearing face 42, each one toroidal in shape and coaxial to the axis of said pin 30. The inside diameter of the second toroidal face 42 is smaller than the inside diameter of the first toroidal face 41.

A conical connecting surface 43 is tangential to the second toroidal face 42 and presents a connecting edge 44 with the first toroidal face 41. The connecting edge 44 has a diameter slightly greater than the diameter of the bottom of the first toroidal face 41. The spring mechanism 37 pushes a ball 45 to the bottom of the first toroidal face 41. This position corresponds to the stable active position of the pin 30; this position is stable due to the slight lip presented by the connecting edge 44. In this stable position, the ball 45 is positioned in a plane 41a which is perpendicular to the axis of the pin 30. Similarly, in the stable inactive position, the ball 45 is positioned in a plane 42i and the distance between the two planes 41a and 42i corresponds to the travel C of the pin 30 between its two stable positions.

The circular connecting edge 44 is located in a plane between the planes 41a and 42i, at a distance from the plane 41a of the first bearing face 41 of between 0.25 and 1.2 mm, and preferably between 0.5 and 1 mm. The travel C is on the order of 4 mm.

When a defective cap 2 pushes the end 31 of the pin 30 for an axial distance greater than said distance between the connecting edge 44 and the plane 41a, the ball 45 rolls along the conical surface 43 and pulls said retaining pin 30 towards the left of FIG. 11, until said ball 45 falls to the bottom of the second toroidal face 42.

For the reset, the cam 38 pushes the end 32 of the retaining pin 30 over an axial distance greater than the distance between the bottom of the second face 42 and the connecting edge 44. The ball 45 then compresses the spring mechanism 37 and, when the lip represented by the connecting edge 44 is exceeded, the ball 45 falls to the bottom of the first toroidal face 41 and the first stable position of the retaining pin 30 is restored.

The lip formed by the connecting edge 44 has a slope 46, on the side of the first toroidal face 41, that forms an angle of only a few degrees. For example, the slope 46 forms an angle of between 1° and 10° and preferably between 4 and 6°. Thus, the retaining pin 30 and the spring mechanism 37 constitute an asymmetric bistable position detector requiring very little effort to trigger. A simple film partially covering the hollow of a cap 2 is sufficient to push the end 31 of the pin 30 with low but sufficient force for the ball 45 to climb the slope 46 and the pin 30 to swing into the stable inactive position where the ball 45 is at the bottom of the second bearing face 42. Such a cam mechanism is sensitive to reduced forces and is therefore sensitive to minor defects in the caps 2, in spite of very high speeds in the selection and conveyance device 15.

FIG. 7 also schematically shows an arrangement of the lower portion of the back wall 23 which allows emptying the channel 20, and in particular the removal of caps retained by the pins 30 and possibly caps in the entry and exit chutes.

The back wall 23 comprises a panel 47 which can move; this panel 47 is, for example, assembled to swing on a hinge 48 and is actuated by an appropriate actuating means such as a simple screw 49 which is inserted between said panel 47 and a tab 50 integrally attached to said back wall 23.

Using FIGS. 12 to 14, we will now describe a conveyance device 15 which only differs from the previously described device by the manner in which the retaining pins 30 are moved, either towards a first stable active position or towards a second stable inactive position of cap 2 retention.

A flange 36' for guiding the pins 30 consists of two disks 52, 53 of magnetic material. The motor 35 rotates, on the shaft 29, a unit assembly successively comprising along said shaft 29: the wheel 21 with notches, the disk 52, and then the disk 53. The disks 52, 53 extend radially and are spaced apart from each other by a constant interaxial distance E.

The retaining pins 30 are distributed around the shaft 29 in the same manner as the pins 30 in the device 15 illustrated in FIG. 3. Each retaining pin 30 comprises a rod 55 of non-magnetic material, such as stainless steel, which slides translationally in two boreholes in alignment with each other, one located in disk 52 and the other in disk 53. Thus the rod 55 is free to move translationally in a direction perpendicular to the disks 52, 53.

Each of the retaining pins 30 also comprises a permanent magnet 56 in the form of a ring surrounding the rod 55, and a spacer 57 of synthetic material. The spacer 57 comprises a radial wall 58 that fits over the rod 55 and a skirt 59 that surrounds the permanent magnet 56. The permanent magnet 56 is attached to the rod 55, sandwiched between a stop 60 on said rod and the radial wall 58 of the spacer, said wall 58 being mounted to press with force against the rod 55. The magnet 56 and the spacer 57 are arranged between the two disks 52, 53.

The pin 30 formed by the rod 55, the magnet 56, and the spacer 57, forms a unit assembly which floats translationally between the two disks 52, 53. The first stable active position of the pin 30 is such that end 31 of said pin 30 is positioned, as before, in one circle of reference and end 32 of said pin 30 is positioned in the other circle of reference.

In addition, the permanent magnet 56 is closer to disk 52 than to disk 53 and is located at a minimal distance D from disk 52 that is equal to the thickness of the radial wall 58.

When a defective cap 2 pushes the end 31 of the pin beyond a neutral position "n" of the pin 30, where the permanent magnet 56 is at an equal distance from the disks 52 and 53, the retaining pin 30 is then pulled into its second stable inactive position.

In its second stable inactive position, the magnet 56 is closer to disk 53 than to disk 52. The end 32 of the retaining pin 30 is positioned in the outer circle. In addition, the magnet 56 is located at a minimal distance d from the disk 53, which corresponds to the axial protrusion of the skirt 59 beyond the magnet 56. Alternatively, the minimal distance d could also be determined by a stop arranged on the rod 55.

Advantageously, the minimal distance d corresponding to the second stable inactive position is less than the minimal distance D corresponding to the first stable position. This allows guaranteeing a force for disengaging the pin 30 that is as weak as desired for detecting an incorrect orientation of the cap 2. However, the force for maintaining the pin 30 in the second stable inactive position is sufficiently high to prevent vibrations due to high speeds in the device from inadvertently reengaging said pin 30 and restoring it to the active retaining position.

The device 15 also comprises a reset cam 38' which may be in the form of a disk as presented above in FIG. 7 or, as represented in FIG. 12, in the form of a half-crown extending parallel to the transfer channel 20. This half-crown cam 38' is attached by a foot 61 to the back wall 23 of the device 15.

Alternatively, any means for attaching the reset cam 38' is appropriate as long as said cam presents a surface which the ends 32 of the pins can press against when said pins 30 are in the stable inactive position. The support surface of the reset cam 38' extends parallel to the back wall 23 of the transfer channel 20.

Thus, the ends 32 of the pin 30 which had been triggered are returned from the inactive position on the outer circle, to a position on the rear circle of reference. The outer circle of the ends 32 of the pins 30, when these are in the inactive position, intersects the plane of the cam 38' at a level located above the ends of the ejection window 33 and, preferably substantially, similarly to the cam 38, at the level of the shaft 29 of the wheel 21 with notches.

It is sufficient for the cam 38' to push against the end 32 of the pin 30 which is in the inactive position, such that the mid plane of the permanent magnet 56 moves from the second stable inactive position to at least the neutral position "n". The attraction of the permanent magnet by the disk 52 then prevails and draws the entire retaining pin 30 assembly into the first stable active position where the caps 2 are retained.

Using FIGS. 15, 17a, 17b, we will now describe an embodiment of a cap propulsion and sorting device which can be adapted to caps of different formats that differ in their cap height. This embodiment differs from the device illustrated in FIGS. 12-14 primarily by the fact that the front wall 26 is rigidly attached to a base 100 that can be moved relative to the back wall 23 by using an adjustment mechanism 101. The adjustment mechanism 101 may comprise a series of manual shifters, only one being represented here. Each manual shifter can comprise a stud 102 attached to the back wall 23, a bore 103 surrounding the stud 102 and attached to the base 100, as well as a rotating handle 104 screwed onto the stud 102 and translationally moving the bore 103. By simultaneously actuating each shifter, the base 100 is displaced parallel to the back wall 23. Any other means for moving the base 100 translationally in a direction perpendicular to the back wall 23 is also appropriate.

As illustrated in FIGS. 17a and 17b, the back wall and the front wall 26 cover the entire chute of the device, meaning the feed portion 17, the transfer channel 20, and the exit portion 18. Thus the device can receive caps of different formats which can differ in the height of the cap between a bottom 105 of the cap 2 and a rim 106 of the cap 2.

The drive shaft 29 which rotates the wheel 21 and the pin-supporting flanges 36' is mounted in a bushing 108 attached to the base 100. Thus the drive shaft 29 for the wheel 21 and the pin-supporting flanges 36' can be moved translationally relative to the back wall 23, at the same time as the base 100.

Advantageously, the reset cam 38' can also be attached to the base 100. The stable active position and the stable inactive position of the ends 31 of the pins 30 are moved translationally by the same distance relative to the back wall 23. Thus during the adjustment, said stable active and inactive positions remain at a same position relative to the front wall 26. When the distance of the two stable positions, active and inactive, of the pins 30 has been set up correctly so that only the properly oriented and non-defective caps 2 are retained for a given cap size (FIG. 17a), it is sufficient to move translationally, as a unit, the base 100 and all that is attached to the base 100, to adjust the device for selecting and sorting caps of another format, that is larger in height for example (FIG. 17b).

In a variant device appropriate for cap sizes varying only slightly in height, it is possible for the wheel 21 with notches not to be moved translationally during the adjustment.

It is understood that a similar adjustment mechanism can also equip the device illustrated in FIGS. 3 to 13. In this case, the flange 36 is mounted onto a bushing attached to the base 100. Preferably, the bushing 39 holding the reset disk 38 can also be attached to the base 100.

FIG. 15 also illustrates a variant of the mechanism for driving the wheel 21 with the notched 22 and pin-supporting flanges 36'. This variant can be applied to all the embodiments described above. This variant comprises a pulley 107 driven by a flexible belt not represented in FIG. 15. This allows a motor M illustrated in FIG. 16 to be fixed relative to a chassis of the device and to drive the pulley 107.

Using FIGS. 16, 17a, 17b, 18a, 18b, we will now describe an embodiment which allows the upward conveyance of caps 2 which may have ribbing on their outer surface. Capping stations 4 for containers 13 require an upward conveyance of caps 2 because the machine 1 preparing the caps 2 and performing the primary sort generally are not immediately adjacent to the capping station 4. In fact, the preparation machine 1 requires allowing delivery carts to access the hopper 5. The capping station 4 is generally located above a machine that fills the containers 13, which is itself surrounded by conveyors that bring empty containers and carry away the filled and capped containers. Thus, in order to feed the capping station 4 from a distance, the caps 2 must be raised by several meters to allow them to flow down an inclined ramp 12 to the capping station 4.

As illustrated in FIGS. 16, 17a, and 17b, the exit portion 18 of the chute comprises a rising part 110 which rises above a cap propulsion means in the chute. The propulsion means may possibly be the wheel 21 with notches described above or any other means. In the example illustrated, the rising part 110 is straight and vertical. The caps 2 propelled by the wheel 21 with notches are guided on one side by a back wall 111 (FIG. 17a) and on other sides by a left side wall 112 and a right side wall 113. The back wall 111 receives the bottom 105 of the cap 2 and may be attached to the back wall 23 of the device or to the chassis, not illustrated. The left side wall 112 is attached and is an extension of the inner side wall 24 of the transfer channel 20. The right side wall 113 corresponds to the outer side wall 25 of said channel 20. The right side wall 113 consists of an active side 114a of a belt 114. The belt 114 runs between two pulleys 115.

The belt 114 has a toroidal cross-section. The free edges 106 of the caps 2 are thus guided laterally on the left side by a surface 112a of the left side wall 112 which is substantially planar and on the right side by a guide surface 116 which is tangential to the active side 114a of the belt and parallel to the left side wall 112. The pulleys 115 rotate so that the active side 114a of the belt moves upward relative to the back wall 111, meaning relative to the chassis of the device. The wall 114a slides along the guide surface 116. Thus the caps 2 that are in the process of climbing the rising part 110 remain guided on their sides between the fixed left side wall 112 and the active side 114a of the belt 114.

The speed of the belt 114 and its active side that forms the wall 114a is, for example, on the order of 1.05 to 1.3 times the speed of the caps 2 in the transfer channel 20.

In another variant, the rising portion 110 may not be vertical, while still rising above the cap propulsion means in the chute. For example, the rising portion 110 may be angled relative to the vertical.

In one variant, the rising portion 110 may not be straight. In this case, the left side wall 112 and the guide surface 116 are not planar and are curved surfaces facing each other in a manner that forms a guide passageway of a fixed geometry relative to the back wall 111. The active side 114a of the belt can then slide on runners such that the active side 114a serving to guide the caps 2 can move upwards along this curved guide surface 116.

In one variant, the side equipped with the belt 114 can be the side forming an extension of the inner side wall 24.

The belt 114 may have any type of cross-section other than circular; for example the belt 114 may have a trapezoidal cross-section.

Using FIG. 18a, we will now describe the blockage phenomenon which can occur in ascending chutes with fixed walls. The side guiding surfaces are distanced from each other by a distance slightly greater than the diameter of the caps 2 to be raised. The number of caps 2 stacked on top of each other may be several hundred, for example. Each of the caps 2 in the process of ascending the rising part is thus subjected to the propelling force F from the cap propulsion means and to the weight P of the caps above it. These two opposing forces tend to cause the caps 2 to alternately press against each of the two side walls. This phenomenon occurs even if the rising part is not strictly vertical. When the gap between the caps and the side walls is small, most of the forces exerted on the caps are those in alignment with the rising chute.

The inventor realized that after a certain threshold, the ascending caps 2 all also begin rotating in an alternating manner. Surprisingly, the inventor realized that this general alternating movement is accompanied by a complete blockage of the ascension of the caps regardless of the propelling force applied to the line of caps. It is as if the caps cease to act independently of each other and establish a general collective behavior in the line of caps. A general blockage abruptly occurs which prevents the flow of caps.

Take the example of a cap 2a pressing against a left side surface, and a cap 2b immediately adjacent and above cap 2a. Cap 2b is pressing against the right side surface. When the line of caps adopts a general collective behavior, the cap 2a rotates in the counter-clockwise direction and causes cap 2b to rotate a clockwise direction. The frictional forces from each cap 2a, 2b rolling against its respective walls are cumulative and work against the ascension of the caps. When the line of caps adopts a general collective behavior, a general blockage occurs which prevents the flow of caps.

Surprisingly, the inventor observed that several parameters were involved in the appearance of the sudden blockage in the line of caps. In particular, the phenomenon appeared after a certain height of ascension, greater than 2 m for example. Other parameters such as the weight of each cap, the stiffness of each cap, the coefficients of friction of the side walls, and the gap between the caps 2 and the side guide walls can also play a role.

The inventor observed that, even more surprisingly, the tendency of the caps to mesh with each other was a major factor in the appearance of cap blockage. In particular, the inventor discovered that the ability of a single file chute to guide the ascension of a line of caps propelled from the lower portion of the chute was very limited when the caps had a ribbed outer edge.

The inventor looked for a technical solution to eliminate the blockage phenomenon in cases where the height of the ascension is significant and/or in the case of ribbed caps.

As illustrated in FIG. 18b, the right side wall 114a slides upwards while forming the same guide passageway as if the right part were unmoving. As soon as the moving wall 114a has an upward speed greater than the speed at which the caps 2a, 2b are rising within the chute, the friction force exerted on the cap 2b by the right side wall 114a is directed upwards and is no longer directed downwards as it is in 18a.

The upward motion of the side wall 114a prevents an accumulation of the effects from friction against the wall 114a. This disengages the interdependent rotation of the caps, which prevents the caps in the rising part 110 from entering a general alternating rotational pattern. In an extremely surprising manner, this eliminates the cap blockage phenomenon, even for chutes that rise for several meters above the cap propulsion means.

For example, the rising part 110 may extend above the cap propulsion means 21 for a height of between 2.7 m and 4 m. In another manner of characterizing this aspect, the rising part 110 may extend above the cap propulsion means for a height more than 100 times the guiding width of the chute corresponding to the maximum diameter of the caps to be raised.

Surprisingly, the rising part 110 equipped with at least one upwardly moving side wall can cause caps with intermeshing ribbed edges to rise.

Also, the use of retaining pins to maintain the properly oriented and non-defective caps within the notch of the wheel 21 with notches allows accepting caps of different diameters, for example varying by 25%. Changing the diameter of the caps to be processed does not substantially affect the supplemental sort function. However, for the same speed of advancement of the star wheel 21, the linear speed of the caps in the rising part 110 also varies by 25%. By choosing a belt 114 speed such that the active side 114a advances at 1.05 times the ascension speed of the caps of the largest diameter, the device can process caps 25% smaller without having to change the drive speed of the pulleys 115 relative to the drive speed of the wheel 21 with notches. These caps having a diameter 25% smaller see the side wall 114a advance at a speed that is 25% faster.

The device of the invention is therefore particularly flexible and is able to adapt to a wide variety of configurations. The sort function based on retaining pins that hold the desirable caps, provides a supplemental screening of the cap orientation and finds defects not yet detected. This supplemental sort process is fairly sensitive to the height of the caps to be sorted, but when combined with means for adjusting the devices to different cap heights allows providing this supplemental sort without reducing any flexibility concerning the caps to be processed.

When the exit portion of the chute is equipped with a side wall that moves, the entire device can be adapted for caps having highly variable properties of mutual friction as well as for caps having a highly variable outside diameter, without being limited by the possible height the caps can be raised.

The invention claimed is:

1. A selection and sorting device for sealing elements or hollow caps for a capping station, said device being in the form of a chute comprising two portions: a feed portion and an exit portion, and, between these two portions, a transfer channel forming an arc and comprising an ejection window, said exit portion designed to be connected to the capping station, said transfer channel partially enclosing a wheel having notches, each notch being adapted to the size of one of said caps, said wheel being associated with pins, wherein each of said pins has the function of retaining a corresponding cap in a corresponding notch as the corresponding cap passes in front of said ejection window, when the corresponding cap is properly oriented and non-defective, and wherein said exit portion is designed to convey said properly oriented and non-defective caps.

2. The device according to claim 1, wherein the ejection window is located in a lower part of said device, such that each cap arriving at the ejection window and not retained by a pin falls through the ejection window due to the effect of the own weight of said cap.

3. The device according to claim 1, wherein each pin is movable between two stable positions:

a stable active position which retains said corresponding cap in the corresponding notch, in which an end of the pin enters a hollow of said corresponding cap, and a stable inactive position in which said corresponding cap is not retained.

4. The device according to claim 3, wherein each stable inactive position of one of the pins is located at a distance transverse to the transfer channel such that the corresponding cap is in no way retained by the pin.

5. The device according to claim 3, wherein each stable inactive position of one of the pins is reached automatically by a reaction when an end of the pin encounters an inverted cap, said inverted cap preventing said end from entering the hollow of said corresponding cap and causing an immediate withdrawing motion of said pin until said pin reaches said stable inactive position.

6. The device according to claim 1, comprising a positive drive mechanism for the wheel with notches, and a pin-supporting flange which is attached to a drive shaft for the wheel with notches.

7. The device according to claim 1, wherein the transfer channel is delimited by slide surfaces comprising a back wall and a front wall which are parallel to each other.

8. The device according to claim 3, comprising a positive drive mechanism for the wheel with notches, and a pin-supporting flange which is attached to a drive shaft for the wheel with notches, wherein the drive shaft is common to the wheel with notches and to the pin-supporting flange, wherein the transfer channel is delimited by slide surfaces comprising a back wall and a front wall which are parallel to each other, and the ejection window has two ejection window ends, and wherein an axis of said drive shaft is inclined relative to the normal of the back wall, in a direction such that the plane of a circle formed by the ends of said pins intersects the slide surface of the front wall along a line which clearly passes above the ejection window ends.

9. The device according to claim 6, wherein the pin-supporting flange comprises two disks of magnetic material which are parallel to each other and which are equipped with guiding means for guiding the retaining pins, said pins each comprising a rod of non-magnetic material which is mounted to freely move translationally within at least one of the disks, in an axial direction, and each pin comprising a permanent magnet attached to said rod, said pin, with its magnet, floating between the two disks.

10. The device according to claim 9, wherein the retaining pin comprises a spacer of non-magnetic material arranged axially between the magnet and each of the two disks, said spacer allowing the adjustment of the distance of the magnet relative to each disk, said distance being greater between said magnet and the disk on the cap side than between said magnet and the other disk.

11. The device according to claim 3, comprising a reset cam for resetting the pins, said reset cam being able to return each pin, when that pin is located outside an angular area of the ejection window, from the stable inactive position to the stable active retaining position.

12. The device according to claim 11, wherein the pins each have a reset end which is at the opposite end from a retaining end, said reset ends being located, when the retaining ends are inactive, in a plane which intersects a plane of the reset cam above the level of the ejection window ends, causing each pin to return to the stable active position automatically as the pin rotates with the wheel with notches and comes into contact with said reset cam.

13. The device according to claim 1, wherein the exit portion comprises an exit chute having a height that can be adjusted by means of sections, in order to delivering the caps at an appropriate level, and wherein the device comprises a feed chute of a height chosen so as to accumulate a certain amount of caps and is able to drive and control the operation of said wheel with notches, said control comprising a detection system which makes use of a sensor to detect the presence of caps, said detection system being located upstream from said wheel with notches, along said feed chute.

14. The device according to claim 7, wherein the back wall comprises a panel which can be moved to allow emptying the transfer channel, said panel being mounted to move relative to the back wall and being actuated by an actuating means such as a screw, said screw being inserted between said panel and a tab that is integral with said back wall.

15. A selection and sorting device for sealing elements or hollow caps intended for a capping station, said device being in the form of a chute comprising two portions: a feed portion and an exit portion, and, between these two portions, a transfer channel forming an arc and comprising an ejection window, said exit portion being intended to be connected to the capping station, wherein said transfer channel partially encloses a wheel having notches, each notch being adapted to the size of one of said caps, said wheel being associated with pins, wherein each of said pins has the function of retaining a corresponding cap in a corresponding notch as the corresponding cap passes in front of said ejection window, when the corresponding cap is properly oriented and non-defective, and in that said exit portion is intended to convey said properly oriented and non-defective caps wherein the transfer channel is delimited by slide surfaces comprising a back wall and a front wall which are parallel to each other, wherein the device comprises an adjustment mechanism designed to move the front wall relative to the back wall in an adjustment direction substantially perpendicular to the back wall, in a manner that varies the thickness of the transfer channel with respect to the adjustment direction between a maximum and a minimum.

16. The device according to claim 15, comprising a positive drive mechanism for the wheel with notches, and
a pin-supporting flange which is attached to a drive shaft for the wheel with notches, and
a reset cam for resetting the pins, said reset cam being able to return each pin from the stable inactive position to the stable active retaining position,
wherein the adjustment mechanism is designed to move the front wall, the pin-supporting flange, and the reset cam by a same adjustment distance.

17. The device according to claim 15, wherein the ejection window is located in a lower part of said device, such that each cap arriving at the ejection window and not retained by a pin falls through the ejection window due to the effect of the own weight of said cap.

18. The device according to claim 15, wherein each pin is movable between two stable positions:

a stable active position which retains said corresponding cap in the corresponding notch, an end of the corresponding pin entering a hollow of said cap, and a stable inactive position in which said corresponding cap is not retained.

19. The device according to claim 1, wherein the exit portion of the chute has at least one rising part that rises above the transfer channel; said rising part being delimited by at least one back wall that is fixed relative to the transfer channel, and two side walls facing one another and each extending along a guide surface, the back wall being intended to receive cap bottoms and the side walls being intended to guide the edges of said caps; at least one of said side walls being able to move relative to the back wall in a sliding upward motion along the same guide surface.

20. The device according to claim 19, wherein the moving wall comprises a portion of a belt.

21. The device according to claim 19, comprising a positive drive mechanism for said moving side wall, designed so that the speed of said moving side wall is greater than or substantially equal to the speed at which the caps are advancing in the exit portion.

22. The device according to claim 1, wherein the wheel rotates about an axis transverse to a direction of gravitational forces acting on the caps as the caps are moved within respective notches of the wheel, such that, for each of the properly oriented and non-defective caps, the corresponding pin retains the cap in the respective notch against the force of gravity, thereby preventing the cap from passing through the ejection window.

* * * * *